US005670950A

United States Patent [19]
Otsuka

[11] Patent Number: 5,670,950
[45] Date of Patent: Sep. 23, 1997

[54] PRIVATE COMMUNICATIONS NETWORK SYSTEM AND METHOD OF AUTHENTICATION FOR A MOBILE STATION USED IN PRIVATE COMMUNICATIONS NETWORKS

[75] Inventor: Kiyokazu Otsuka, Tokyo, Japan

[73] Assignee: NEC Corporation, Tokyo, Japan

[21] Appl. No.: 506,949

[22] Filed: Jul. 13, 1995

[30] Foreign Application Priority Data

Jul. 13, 1994 [JP] Japan .................... 6-160872

[51] Int. Cl.$^6$ .............. G06F 7/04; H04B 1/034; H04M 7/00
[52] U.S. Cl. ............. 340/825.33; 379/225; 379/221; 455/49.1; 455/54.1; 455/54.2; 455/56.1; 340/825.34
[58] Field of Search .............. 340/825.33, 825.34, 340/825.47; 379/58, 60, 111, 112, 219, 220, 221, 225; 455/49.1, 54.1, 54.2, 56.1

[56] References Cited

U.S. PATENT DOCUMENTS

| | | | |
|---|---|---|---|
| 5,031,211 | 7/1991 | Nagai et al. | 379/221 |
| 5,422,943 | 6/1995 | Cooney et al. | 379/225 |
| 5,430,794 | 7/1995 | Ayame | 379/114 |

OTHER PUBLICATIONS

"Mobile Communication Application Part Signalling System", TTC specification JJ-70.10 (Japanese Version), Node to node interface of PDC (Personal Digital Cellular) digital mobile communication, pp. 3–91. No Date Available.

Primary Examiner—Michael Horabik
Assistant Examiner—Yonel Beaulieu
Attorney, Agent, or Firm—Young & Thompson

[57] ABSTRACT

A private communications network system allows a mobile station to be used in a different private communications network than that in which it is registered, by a method of authenticating the mobile station outside of its home private communication network. When a mobile station 17 requests location registration in a private communications network 2 in which the mobile station 17 is not registered, a control unit 22 of a PBX 21 in the private communications network 2 requests a network common data management unit 3 to send group data which is used to identify a private communications network 1 in which the mobile station 17 is registered. Control trait 22 then requests a PBX 11 in a private communications network 1 to send subscriber data 33 of the mobile station 17. The mobile station 17 is authenticated in the private communications network 2 by the subscriber data 33 sent from its home private communications network 1, whereafter the mobile station 17 can make calls from or can receive incoming calls in the private communications network 2. Billing data for calls the mobile station has made in the private communications network 2 is transferred and stored in the home network common data management unit 3 on a group basis.

4 Claims, 5 Drawing Sheets

PRIVATE COMMUNICATIONS NETWORK SYSTEM AND METHOD OF AUTHENTICATION FOR A MOBILE STATION USED IN PRIVATE COMMUNICATIONS NETWORKS

BACKGROUND OF THE INVENTION

1. Field of the Invention

The present invention relates to a private communications network system and a method of authentication for a mobile station used in private communications networks, and more particularly, to a private communications network system which has a capability of mobile communications and allows a mobile station registered in a different private communications network system to be used in the private communications network area; and to a method of authentication for a mobile station to allow its use in different private communications networks.

2. Description of Related Art

In a public mobile communications network, it is possible to send or receive calls at a mobile station which is registered as a subscriber in a different public mobile communications network by an authentication which exchanges necessary information of the mobile station between each public mobile communications network for its use in a different public mobile communications network area.

The following method of authentication for allowing a mobile station arriving from a different public communications network to make or receive calls is generally adopted in such a public mobile communications network.

(1) Information of a mobile station is stored in a mobile telephone switching system in a public mobile communications network in which the mobile station is registered as a subscriber. The mobile telephone switching system which stores information of subscribers is called a home memory station.

(2) When a mobile station requests a location registration or a call origination in a public mobile communications network in which the mobile station is registered as a subscriber, the home memory station retrieves information of the mobile station (subscriber) from its database with a subscriber number contained in a requesting signal as an index key. An authentication is executed by comparing authentication information stored in the database with authentication information sent from the mobile station. If the mobile station is acknowledged as a proper subscriber in the network, updating of the location information or processing of the call origination is performed.

(3) When a mobile station requests a location registration or a call origination in a different public mobile communications network in which the mobile station is not registered as a subscriber, the mobile telephone switching system in this network requests the information of the mobile station from its home memory station through a signal transmission line by a protocol mutually arranged with other networks, and executes an authentication by comparing authentication information received from the home memory station with authentication information sent from the mobile station. If the mobile station is acknowledged as a proper subscriber, updating of the location information or processing of the call origination is performed, and also the location information in the home memory station is updated by transferring the location information from the mobile telephone switching system in this network to the home memory station.

(4) When there is an incoming call to a mobile station, the home memory station searches the location information of the mobile station and terminates the incoming call to the mobile station if the mobile station is located in a public mobile communications network of the home memory station. However, if the location information indicates the different public mobile communications network from which the location information was transferred and updated, the home memory station transfers the call to a mobile telephone switching system in that network to request the call termination to the mobile station currently being located in flint network.

(5) When a call originated by a mobile station has completed, a tariff for the call is stored as the charging information for each mobile station at the home memory station. Therefore, when the call is originated at the different public mobile communications network, the tariff is transferred to the home memory station from the mobile telephone switching system in the different public mobile communications network.

As described above, in public mobile communications networks, a mobile station is allowed to make a call or to receive a call even if the mobile station is located in a different public mobile communications network. This is realized by the authentication of the mobile station which compares the authentication information sent from the mobile station and the stored information transferred from the home memory station to a mobile telephone switching system in the different public mobile communications network.

On the other hand, as a private communications network composed of private branch exchanges (PBXs) is managed by an individual private company or enterprise, the authentication system of mobile stations is also independently managed in each private communications network which has a capability of mobile communications, and the authentication information is therefore not exchanged with other private communications networks. Therefore, it is not possible to use a mobile station in a different private communications network.

Also, in a private communications network, it is necessary to manage charging information on a group basis which consists of several mobile stations belonging to the same division or department in a private company or enterprise, instead of managing on an individual mobile station basis.

SUMMARY OF THE INVENTION

The present invention provides a private communications network system which allows a mobile station to be used in a different private communications network than that in which it is registered, and a method of authentication for a mobile station to allow its use in different private communication networks.

To do this, the private communications network system according to the invention includes at least one first PBX, which is interconnected to second PBXs in other private communications network systems, wherein base stations and first mobile stations are provided for mobile communication services, and comprises the following elements:

common data management memos provided in common to a plurality of private communications network systems and interconnected to each of the first and second PBXs for communicating with each PBX, which manages group number data corresponding to an identification number of each mobile station of each private communications network system, and network identification data including a private communications network system number and billing information corresponding to the group number information;

subscriber data corresponding to each of the first mobile stations for indicating authentication information and location information, and stored in the first PBX;

temporary subscriber data also stored in the first PBX for indicating authentication information and location information of the second mobile station, which is registered in a different private communications network system, and has entered into a new private communications network system area and requested to make or receive calls; and authentication means for authenticating the second mobile station having requested to be used in this private communications network system which comprises inquiring means for communicating with the common data management means for requesting and receiving identification of a private communications network number corresponding to the second mobile station;

requesting means for communicating with one of the second PBXs in which the second mobile station is registered for requesting a transmission of subscriber data of the second mobile station and storing the subscriber data transmitted into the temporary subscriber data means; and control means for authenticating the second mobile station by using authentication information contained in the temporary subscriber data, updating location registration information contained in the temporary subscriber data, instructing the second PBX in which the second mobile station is registered to update subscriber data corresponding to the second mobile station, and notifying the second mobile station that it is authorized to be used in this private communications network system area.

The system may also include billing memos for storing billing data of calls originating from the second mobile station and sent to the common data management means on a group number basis corresponding to the second mobile station.

The common data management means according to this invention can be located in each private communications network system area.

A method of authentication for a mobile station according to this invention comprises the following steps of:

interrogating the common data management means to obtain a private communications network number corresponding to the second mobile station when the second mobile station has requested to be used in private communications network;

requesting transmission of subscriber data of the second mobile station from one of the second PBXs in a private communications network indicated by the obtained private communications network number;

introducing the transmitted subscriber data into the temporary subscriber data;

authenticating the second mobile station by using authentication information contained in the temporary subscriber data;

updating location registration/formation contained in the temporary subscriber data;

instructing the second PBX in which the second mobile station is registered to update subscriber data corresponding to the second mobile station;

notifying the second mobile station to authorize its use in this private communications network system area; and storing billing data of calls originating at the second mobile station in the common data management means on a group number basis corresponding to the second mobile station.

DETAILED DESCRIPTION OF PREFERRED EMBODIMENTS

Figure 1:
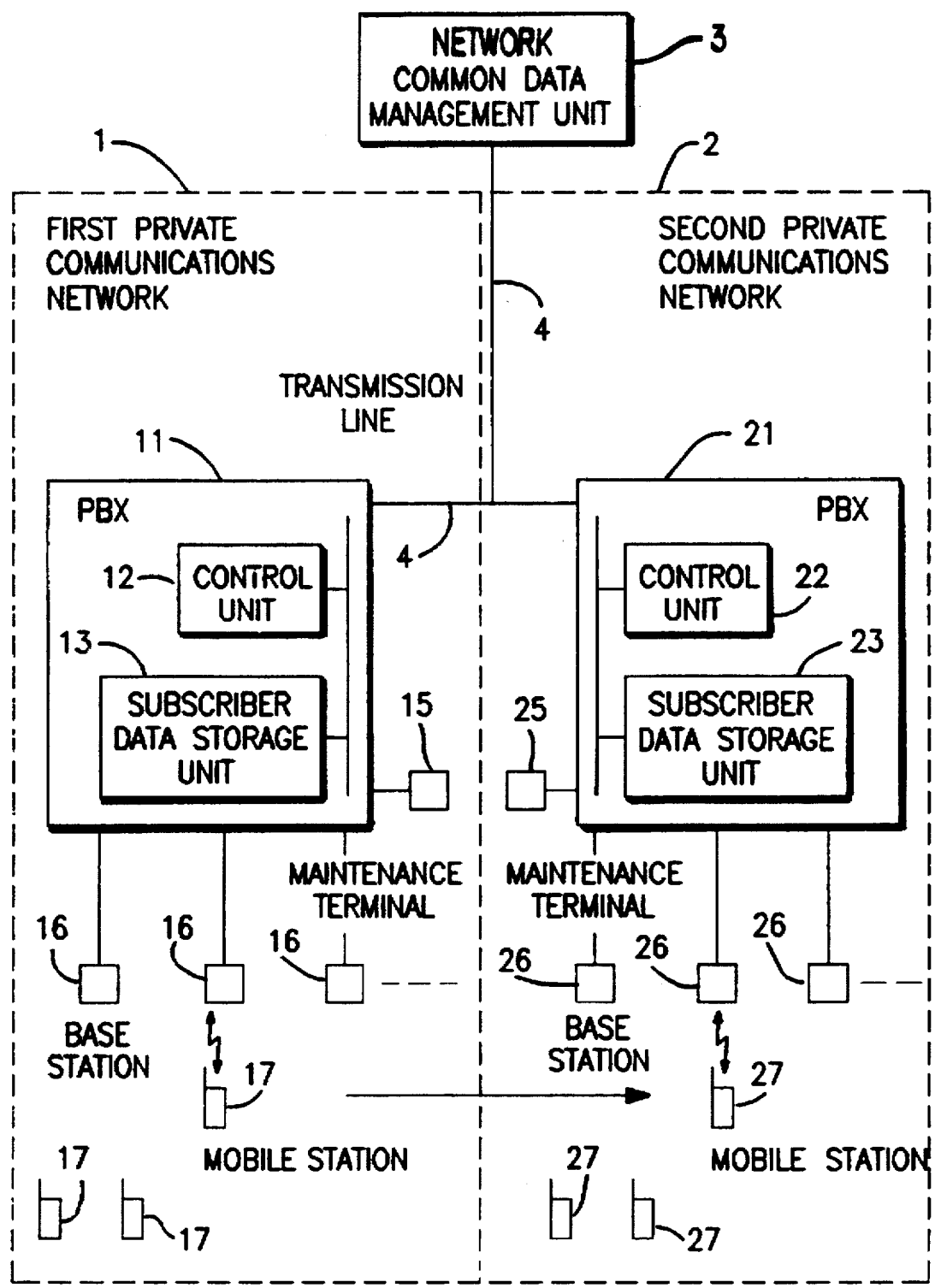
FIG. 1 is a schematic block diagram illustrating a configuration of a private communications network of a first embodiment of this invention.
Figure 2A:
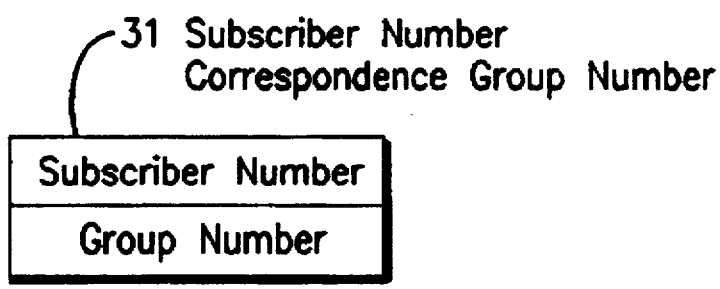
FIGS. 2A–2D are diagrams showing examples of data construction used in this embodiment.
Figure 2B:
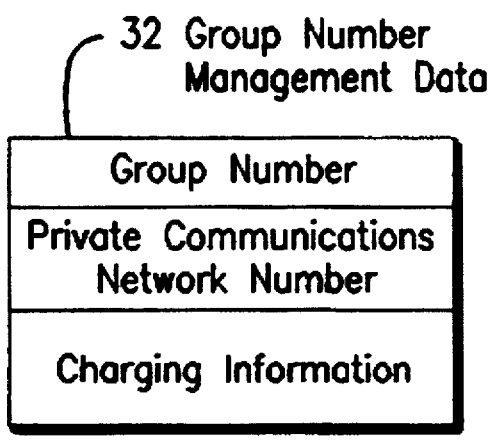
Figure 2C:
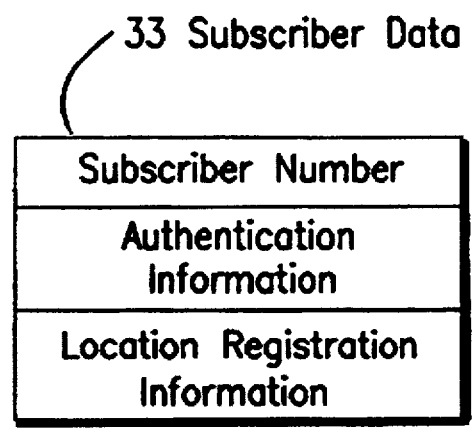
Figure 2D:
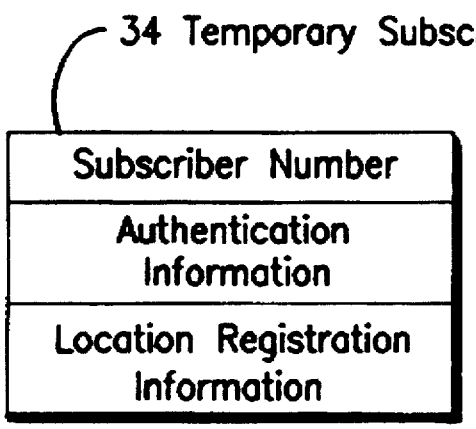

Two private communications networks (hereafter referred to as network or networks) are shown in FIG. 1, i.e., the first network 1 and the second network 2. Each network has a PBX 11 and a PBX 21 respectively for controlling the mobile communications in each network. Those PBXs are connected by transmission line 4 to each other, and also they are connected to a network common data management unit 3 which manages common data of each network for interconnections with different networks, namely with each other and also with others (not flown) that are commonly accessed by each network.

The first network 1 comprises the PBX 11, which includes a control unit 12 for controlling several control signal processing operations, and a subscriber data storage unit 13 for storing subscriber data of mobile stations 17 within the network area and also temporarily storing subscriber data of mobile stations in other networks. Also provided are base stations 16 for establishing a radio interface with mobile stations 17 to effect mobile communications within the network area and a maintenance terminal 15 that registers several types of data, such as the authentication information and group data, for mobile stations 17.

The second network 2 has a similar configuration and comprises PBX 21, which includes a control unit 22 and a subscriber data storage unit 23, and communicates with base stations 26, mobile stations 27 and a maintenance terminal 25.

FIGS. 2A–2D are data construction diagrams showing examples of data construction used in the present invention.

A subscriber number correspondence group number 31 is data indicating the subscriber number of a mobile station and fie group number to which the mobile station belongs, and this data is stored in the network common data management unit 3 of FIG. 1.

Group number management data 32 is data indicating the group number to which a mobile station belongs, a private communications network number corresponding to the group number and charging information in which the charges for calls are accumulated on a group basis, and this information is also stored in the network common data management unit 3.

Subscriber data 33 is data indicating a subscriber number, authentication information and location registration information for each mobile station in the network, and this data is stored in the subscriber data storage unit 13, 23 in each PBX 11, 21.

Temporary subscriber data 34 is data which temporarily indicates a subscriber number, authentication information and location registration information for a mobile station which belongs to the other network but is currently located in this network. This data is prepared when a mobile station belonging to a different network requests a location registration in this network, and is stored in the subscriber data storage unit 13, 23 in each PBX 11, 21.

Figure 3A:
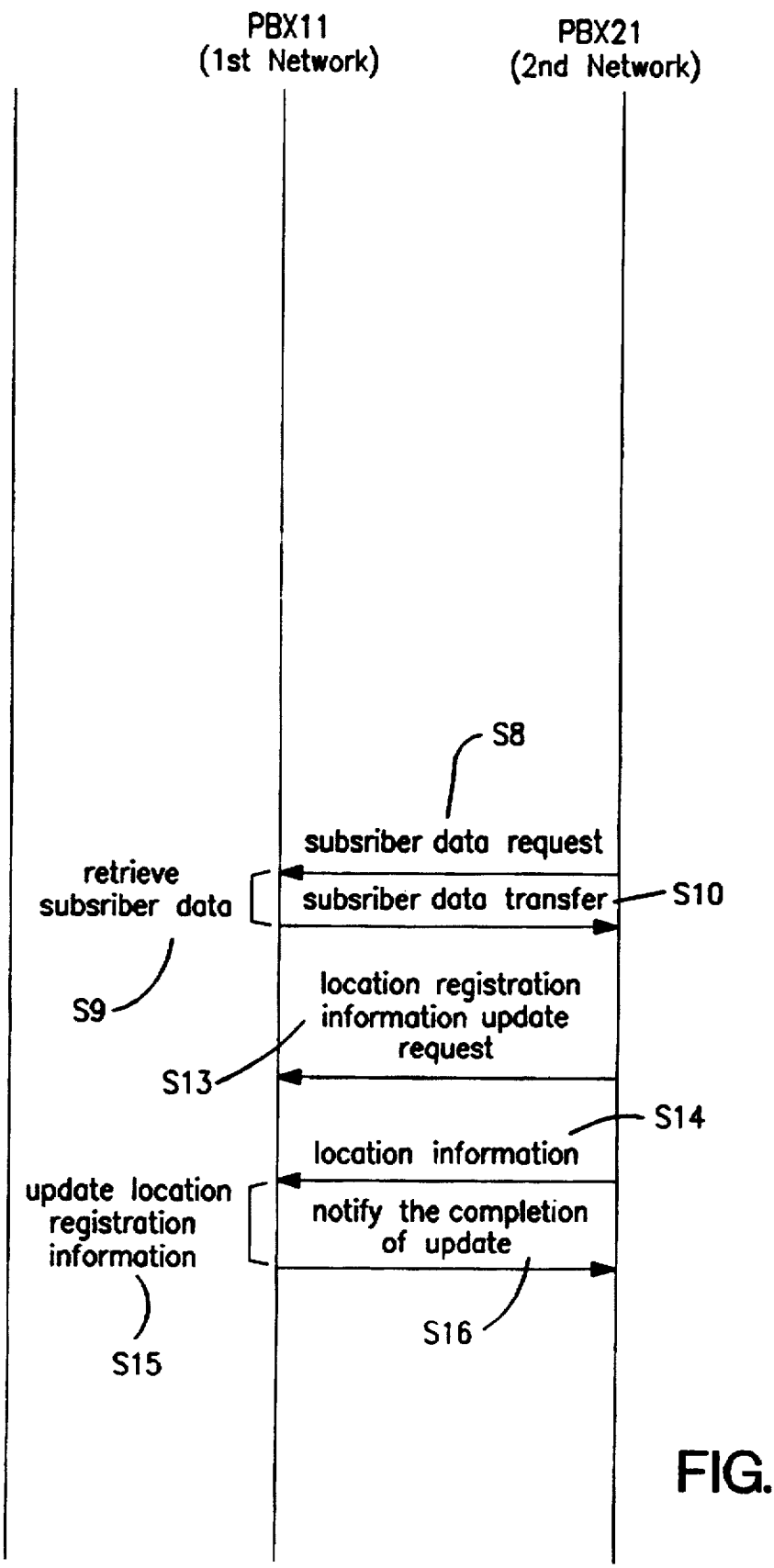
FIGS. 3A and 3B are a sequence diagram showing procedures of the location registration request and a call origination by a mobile station in a different private communications network.
Figure 3B:
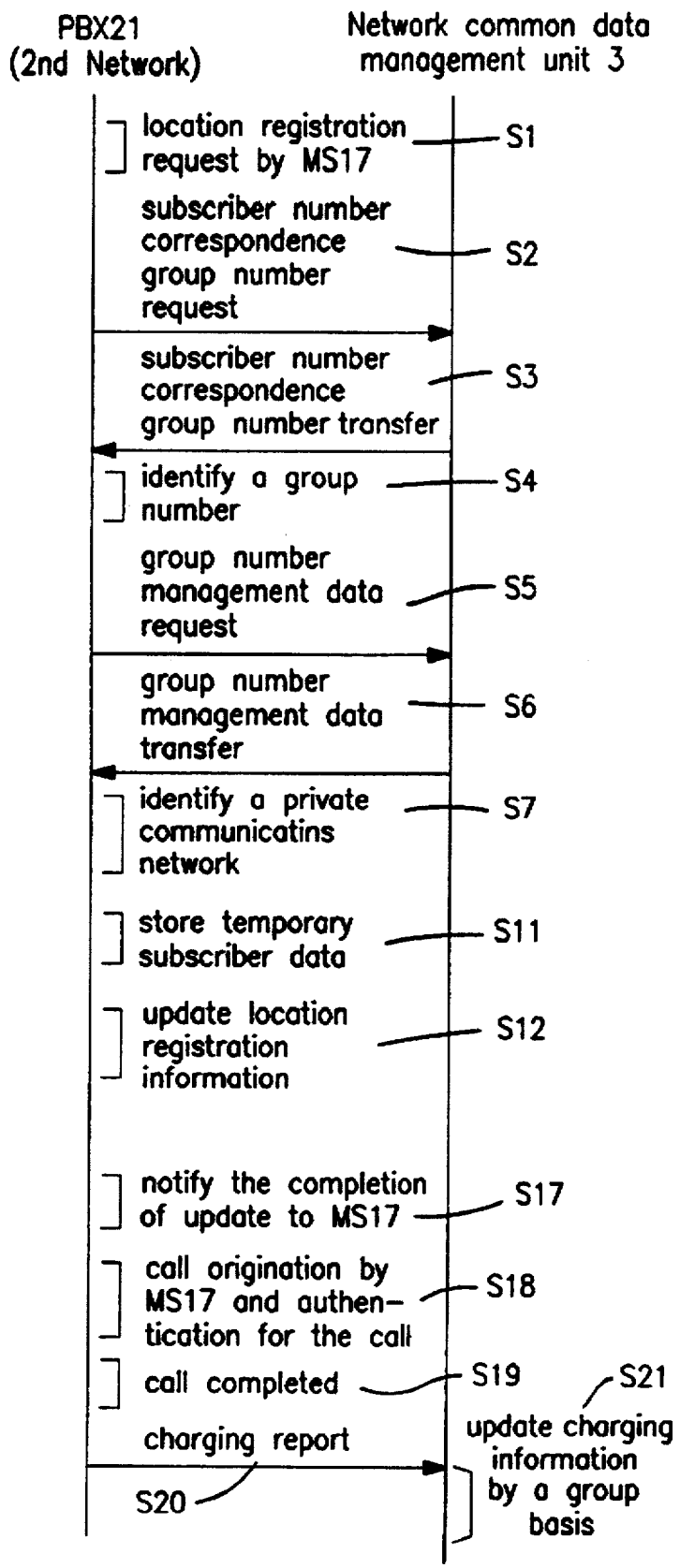

The processing of a location registration request and a call originating in the second network 2 by one of mobile stations 17 registered in the first network 1 will be described by referring to FIG. 3A and 3B.

When the mobile station 17 (MS 17) has moved from the first network 1, which is the home network area for the mobile station 17, to the second network 2, which is the different network area for the mobile station 17, and requests location registration in the second network, a location registration request signal including a mobile station identification number (subscriber number) is transmitted to a base station 26, whereupon the base station 26 transfers the location registration request signal from the base station 17 to the control unit 22 in the PBX 21 (step S1).

The control unit 22, which has received the location registration request signal, then requests the network common data management unit 3 to send a subscriber number correspondence group number 31 which corresponds to the subscriber number of mobile station 17, and identifies the group number of the group to which the mobile station 17 belongs based on the subscriber number correspondence group number 31 transmitted from the network common data management unit 3 as a response (steps S2 to S4).

The control unit 22 next requests the network common data management unit 3 to send group number management data 32 which corresponds to the group number obtained in the previous procedure, and identifies a private communications network number in which the mobile station 17 is registered based on the group number management data 32 transmitted in response from the network common data management unit 3 (steps S5 to S7).

Once the network in which the mobile station 17 is registered has been identified as the first network 1, the control unit 22 requests the first network 1 which is the home network of the mobile station 17 to send subscriber data 33 of the mobile station 17 (step S8).

In the PBX 11 of the first network 1, the control unit 12 analyzes the request from the control unit 22 in the second network 2 and, as a result, reads out the subscriber data 33 corresponding to the mobile station 17 from the subscriber data storage unit 13, and transfers the subscriber data 33 to the control unit 22 through the transmission line 4 (steps S9 and S10).

The control unit 22 in the PBX 21 receives the subscriber data 33 of the mobile station 17 from its home network, and then temporarily stores the data in the subscriber data storage unit 23 as temporary subscriber data 34 (step S11).

Next, the control unit 22 authenticates the mobile station 17 by using the authentication information contained in the temporary subscriber data 34. If the mobile station 17 is identified as a mobile station which is authorized to be used in the second network 2, the location registration information contained in the temporary subscriber data 34 is updated with the location information of the area from which the mobile station 17 has reported (step S12).

Once the location registration information for the mobile station 17 has been updated in the second network 2, the control unit 22 transfers the updated temporary subscriber data 34 to the control unit 12 in the PBX 11 of the first network 1 together with a location registration information update request signal to request updating of the location registration information of the mobile station 17 in the subscriber data storage unit 13 (steps S13 and S14). The control unit 12 receives the location registration information update request signal and the updated location registration information for the mobile station 17, and then updates the location registration information contained in the subscriber data of the mobile station 17 stored in the subscriber data storage unit 13 (step S15).

Therefore, even if the location registration information of a mobile station is updated in a different network, the updated information is transferred to the home network of the mobile station and synchronously updated to maintain the current location registration information.

The control unit 12, which has completed updating of the location registration information of the mobile station 17, transfers a location registration information update completion notification signal to the control unit 22 in the PBX 21 of the second network 2 (step S16). The control unit 22, having received the notification signal, then notifies the mobile station 17 through the base station 26 that the location registration request has been accepted (step S17).

As described above, the location registration of the mobile station 17 in the second network 2 which is not the home network of the mobile station 17 is accomplished and the mobile station 17 is now available for making a call or receiving an incoming call in the second network 2.

If the mobile station 17 makes a call, the authentication is executed by using the authentication information contained in the temporary subscriber data 34, which is stored in the subscriber data storage unit 23, and billing information for the call is transferred to the network common data management unit 3. The network common data management unit 3 having received the billing data from the control unit 22 introduces the data into the billing information of the group number management data 32 which corresponds to the subscriber number of the mobile station 17 (steps S18 to S21).

On the other hand, if there is an incoming call to the mobile station 17 when it is located in the second network 2, the incoming call is first handled in the PBX 11 of the first network which is the home network of the mobile station 17. The control unit 12 recognizes that the mobile station 17 is now located in the second network 2 by referring to the location registration information of the subscriber data 33 stored in the subscriber data storage unit 13, and transfers the incoming call to the PBX 21 in the second network 2 through the transmission line 4.

When the incoming call is transferred to the PBX 21, the control unit 22 of the PBX 21 identifies the location information of the mobile station 17 by referring to the local/on registration information of the temporary subscriber data 34 stored in the subscriber data storage unit 23, and then sends the incoming call to the mobile station 17 through the base station 26.

If the mobile station 17 has not requested location registration in the second network 2, the location registrar/on information of the subscriber data 33 stored in the subscriber data storage unit 13 in the PBX 11 still indicates the previous location (i.e., it has not been updated). Therefore, the incoming call is handled only in the first network 1, which tries to send it to the mobile station 17 by using the subscriber data currently stored in the subscriber data storage unit 13. As a result, the incoming call is rejected due to no response from the mobile station 17 which is then located in the second network 2.

While the case where the mobile station 17 registered in first network 1 moved to second network 2 has been described, the same procedures apply to the case where the mobile station 27 which belongs to the second network 2 has moved to the first network 1.

As described above, a network common data management unit 3 is used, and the network common data such as the subscriber number correspondence group number mad the group number management data stored in the network common data management unit 3 are accessed commonly from any other network to identify a mobile station which is registered in a different network. Therefore, a location registration request made by a mobile station which has moved to a different network is accepted, and the mobile station is available for making a call or receiving an incoming call even if the mobile station is located in the different network. Furthermore, the billing for calls made by the mobile station from the different network is transferred to the network common data management unit and managed on a group basis for the network in which the mobile station is registered, thereby to allow simple and easy management of the billing information.

Figure 4:
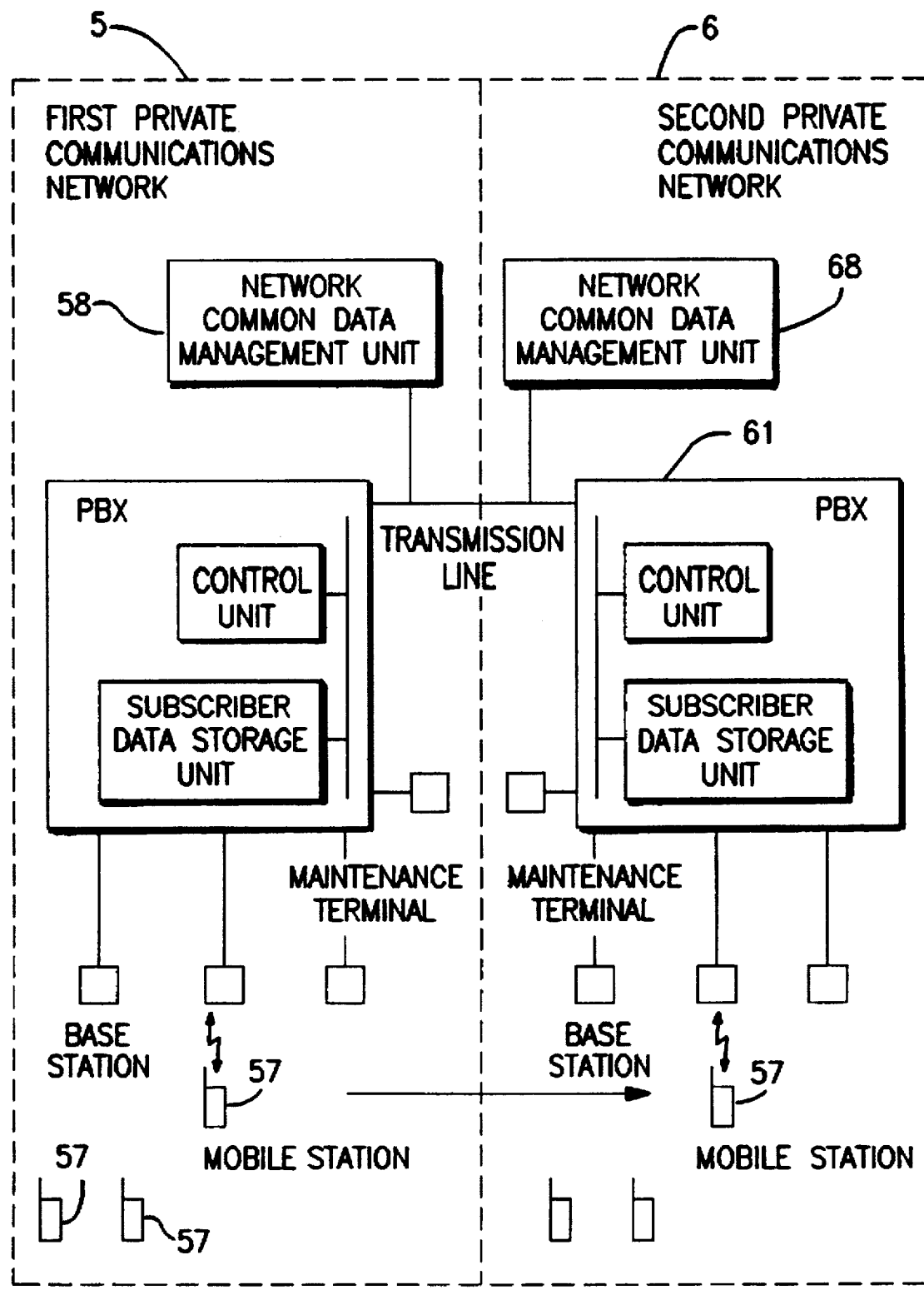
FIG. 4 is a schematic block diagram illustrating a configuration of a private communications network of a second embodiment of this invention.

FIG. 4 is a schematic block diagram illustrating a configuration of a private communications network of a second embodiment of this invention. In this embodiment, the network common data management unit is provided in each private communications network, i.e., the network common data management unit 58 is in the first network 5 and the network common data management unit 68 is in he second network 6. Otherwise, the configuration is the same as the configuration of FIG. 1.

All billing information for calls originating from a certain network is managed in the network common data management unit provided in that network, i.e., not only the billing information for calls made by mobile stations registered in that network but also the billing information for calls made by mobile stations registered in other different networks. For example, when the mobile station 57 which is registered in the first network 5 has entered the second network 6, has been authenticated and has made a call, the billing data for the call is transferred from rite PBX 61 to the network common data management unit 68 and the billing data for the mobile station 57 is managed by the network common data management unit 68, and it is treated as a debit of the first network 5 which will be charged later.

Therefore, as to each network, billing information for all calls mae by mobile stations located in that network is stored in the network common data management unit provided in that network, and processing of the billing information becomes easier and quicker.

While the above embodiments are described with reference to two private communications networks, the present invention is not limited to this, and any number of two or more private communications networks interconnected with each other by transmission lines can be employed.

Although the present invention has been fully described by way of various preferred embodiments thereof with reference to the accompanying drawings, numerous changes and modifications will be apparent to those having skill in this field. Therefore, unless these changes and modifications otherwise depart from the scope of the present invention, they should be construed as included therein.

I claim:

1. A private communications network system comprising at least one first private branch exchange interconnected to second private branch exchanges in a plurality of other private communications network systems by transmission lines, and having a plurality of base stations and a plurality of first mobile stations for providing mobile communication services, said private communications network system further comprising:

common data management means provided in common to a plurality of private communications network systems including said private communications network system and interconnected to said first and second private branch exchanges by transmission lines for communicating with each private branch exchange, for managing group number data corresponding to an identification number of a mobile station of each private communications network system and network identification data including a private communications network system number and billing information corresponding to the group number information;

subscriber data corresponding to each of said first mobile stations and stored in said first private branch exchange, said subscriber data indicating authentication information and location information;

temporary subscriber data stored in said first private branch exchange and provided for a second mobile station from another private communications network system, that has entered into said private communications network system and requested mobile communications, said temporary subscriber data indicating authentication information and location information of said second mobile station and authentication means for authenticating the second mobile station having requested mobile communications in said private communications network system, said authentication means comprising inquiring means for communicating with said common data management means for requesting and receiving identification of a private communications network number corresponding to said second mobile station;

requesting means for communicating with a second private branch exchange in one of said other private communications network systems indicated by said identification of a private communications network number for requesting a transmission of subscriber data of said second mobile station and storing said subscriber data transmitted into said temporary subscriber data means; and control means for authenticating said second mobile station by using authentication information contained in said temporary subscriber data, updating location information contained in said temporary subscriber data, instructing said second private branch exchange in said other private communications network system indicated by said identification of a private communications network number to update subscriber data corresponding to said second mobile station, and notifying the second mobile station that it is authorized to be used in said private communications network system area.

2. The private communications network system according to claim 1 wherein said control means includes billing means for storing billing data of calls originating from said second mobile station and sent to said common data management means on a group number basis corresponding to said second mobile station.

3. The private communications network system according to claim 2 wherein said common data management means is located in each of said private communications network systems.

4. A method of authenticating a mobile station used in a private communications network including at least one first private branch exchange interconnected to second private branch exchanges in a plurality of other private communications network systems, and to common data management means provided in common to a plurality of private communications network systems managing group number data corresponding to an identification number of a mobile station of a private communications network system and network identification data including a private communications network number and billing information corresponding to said group number information, said first private branch exchange having a plurality of base stations and a plurality of first mobile stations for providing mobile communication services, and also having subscriber data corresponding to each of said first mobile stations for indicating authentication information and location information and temporary subscriber data for a second mobile station of one of said other private communications network systems that has entered into said private communications network and requested mobile communications, for indicating authentication information and location information of said second mobile station, said method of authenticating the mobile station comprising the steps of:

interrogating said common data management means to obtain a private communications network number corresponding to said second mobile station when said second mobile station has requested to be used in said private communications network;

requesting transmission of subscriber data of said second mobile station from a second private branch exchange in one of said other private communications network systems indicated by said obtained private communications network number;

introducing said transmitted subscriber data into said temporary subscriber data;

authenticating said second mobile station by using authentication information contained in said temporary subscriber data;

updating location information contained in said temporary subscriber data;

instructing said second private branch exchange in said other private communications network system indicated by said private communications network number to update subscriber data corresponding to said second mobile station;

notifying said second mobile station to authorize its use in said private communications network system; and storing billing data of calls originating at said second mobile station in said common data management means on a group number basis corresponding to said second mobile station.

* * * * *